Patented May 24, 1932

1,859,527

UNITED STATES PATENT OFFICE

JOSEPH BARON PAYMAN AND HENRY ALFRED PIGGOTT, OF BLACKLEY, MANCHESTER, ENGLAND, ASSIGNORS TO IMPERIAL CHEMICAL INDUSTRIES LIMITED, OF LONDON, ENGLAND

MANUFACTURE OF COMPOUNDS OF THE MORPHOLINE SERIES AND THE PRODUCTS

No Drawing. Application filed August 1, 1928, Serial No. 296,863, and in Great Britain September 1, 1927.

This invention relates to a new method for the manufacture of morpholine,

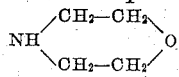

its homologues and derivatives; that is the production of compounds having the following general formula

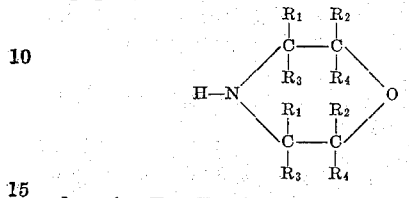

wherein $R_1$, $R_2$, $R_3$ and $R_4$ represent hydrogen or substituent groups other than halogen. The new process is especially applicable to the production of such compounds in which one or more of the substituent groups are alkyl, aryl or carboxylic groups.

The new process comprises condensing a beta-hydroxy-alpha-halogenated derivative of ethane or a homologue of the same, that is a compound of the general type

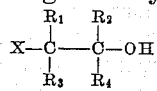

wherein $R_1$, $R_2$, $R_3$ and $R_4$ represent hydrogen or substituent groups other than halogen and X represents a halogen, with an aromatic sulphonamide having the general formula $R-SO_2-NH_2$ wherein R represents an aryl residue free from unsubstituted amino groups. This condensation produces an N-di-substituted arylsulphonamide of the characteristic structure

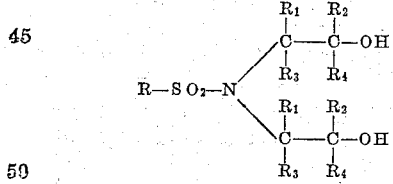

This N-di-substituted arylsulphonamide is then isolated and treated with a condensing agent, for instance concentrated sulphuric acid, at a temperature above 100° C. to effect a ring closure and thereby produce a morpholyl arylsulphonamide which is an intermediate product in the process and may be separated as such. To produce the morpholine compound, this morpholyl arylsulphonamide is hydrolyzed and the morpholine compound which is split off is then isolated. As stated above the intermediate morpholyl arylsulphonamide may be isolated and then hydrolyzed to produce the morpholine compound. It is also within the scope of our invention to carry out the process without isolating the intermediate product and produce directly the morpholine compound. That this intermediate product can be isolated as such, shows that in the present process the ring closure occurs before scission.

The reactions taking place in the present process, for example, when ethylene chlorohydrin is used, are probably as follows:

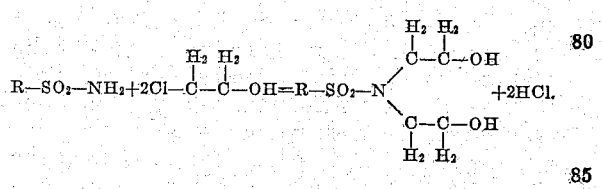

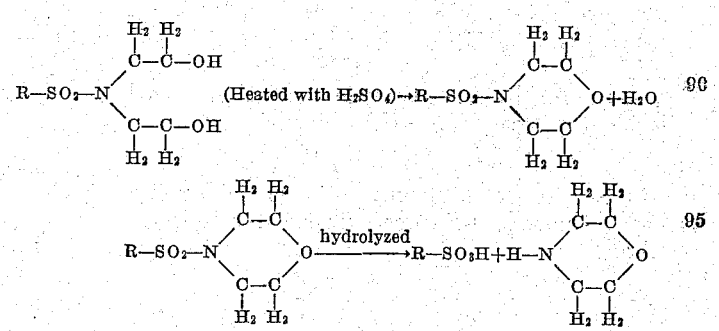

By the present process it is not only possible to prepare morpholine in a new and advantageous manner but also many new morpholine compounds which have not heretofore been prepared can be obtained. The morpholine compounds, including morpholine itself, prepared by the present process can be used in the production of dyes, rubber chemicals etc. In a copending application Ser. No. 290,878 filed by one of us, Joseph Payman, and another, there are disclosed processes for converting these morpholine compounds into other compounds which are useful in processes of vulcanizing rubber to produce a vulcanized product having superior properties.

The following examples illustrate, without limiting, our invention:

*Example 1.*—215 kgms. of toluene-p-sulphonamide, 575 litres of 35.8% aqueous ethylene chlorhydrin and 252 litres of 10.4 N-caustic soda are charged into a vessel which is then sealed so as to be air-tight, and the contents agitated vigorously. In the course of an hour or so the reaction is marked by an increase in temperature to 50–60° C. and an oil separates, and after a time solidifies. At the end of 48 hours the crystalline solid is filtered off, well pressed from any oil present and dried at 50–60° C. The N-di(β-hydroxyethyl) toluene-p-sulphonamide so obtained contains a little of the monohydroxyethyl derivative and some sodium chloride, but is sufficiently pure to be used for the preparation of morpholine. A mixture of 270 kgms. of the crude product thus obtained and 100 kgms. of 100% sulphuric acid is gradually heated, in a vessel fitted with a reflux condenser, to 160° C. at which temperature a vigorous reaction sets in; a little steam is evolved and the temperature rises to 190–200° C. When this first reaction is ended the mixture is maintained at 170–180° C.; the condensation of water gradually ceases and about an hour after it is ended the mixture is poured into water and neutralized by a stream of milk of lime flowing under the surface of the well agitated liquid. The calcium sulphate is separated by filtration, and the liquor is concentrated, made strongly alkaline with caustic soda and distilled in steam until the distillate is no longer alkaline. The morpholine may be separated from the distillate as hydrochloride by evaporation of the solution after acidification with hydrochloric acid.

By using in this example a solution of 234 kgms. of propylene α-chlorhydrin,

ClCH$_2$.CH(OH).CH$_3$, in place of the solution of ethylene chlorohydrin, there is produced 2:6-di-methylmorpholine,

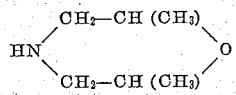

which in the pure condition is a colorless liquid boiling at about 145° C. under atmospheric pressure, which has an ammoniacal odor and is a strong base.

Similarly, from the chlorohydrin of cinnamic acid, viz. β-chloro-alpha-hydroxy-beta-phenyl-propionic acid (obtained from phenyl-glycidic acid and hydrogen chloride), we obtain 3:5-diphenyl-morpholine-2:6-dicarboxylic acid

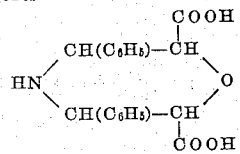

*Example 2.*—270 kgms. of N-di(β-hydroxyethyl) toluene-p-sulphonamide as obtained in Example 1 is gradually heated with 5 kgms. of sulphuric acid in an open vessel to 160–170° C. and maintained at that temperature until water vapour ceases to be evolved. On cooling the toluene-p-sulphonyl-morpholylamide forms a crystalline mass of the required derivative, which may be purified by grinding with water and filtering.

What we claim and desire to secure by Letters Patent is:—

1. In the manufacture of morpholines the step which comprises reacting a toluene sulphonamide with a beta-halogeno-alcohol in the molecular ratio of at least 2 molecules of beta-halogeno-alcohol to 1 molecule of the toluene sulphonamide.

2. In the manufacture of morpholines, the process which comprises reacting one molecular proportion of a toluene sulphonamide with two molecular proportions of a beta-halogeno-alcohol, heating the di-substituted toluene sulphonamide condensation product thus obtained to effect in succession ring closure by elimination of one mol of water derived from hydroxyl groups contained in said condensation product, thereby producing a morpholyl toluene sulphonamide, and removal of the toluene sulphonyl group by hydrolyzing, thus setting free the morpholine compound.

3. In the manufacture of morpholines, the step which comprises reacting an arylsulphonamide of the type R—SO$_2$—NH$_2$ wherein R represents a benzene nucleus free from unsubstituted amino groups, with a beta-halogeno-alcohol of the type

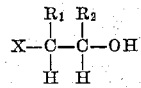

wherein X represents a halogen, R$_1$ represents hydrogen or a benzene nucleus and R$_2$ represents hydrogen, an alkyl group or a carboxylic group, in the molecular ratio of at least two molecules of the beta-halogeno-alcohol to 1 molecule of the said arylsulphonamide.

4. In the manufacture of 2:6-dimethylmorpholine, the process which comprises reacting toluene-para-sulphonamide with propylene alpha-chlorohydrin in the molecular ratio of at least two molecules of propylene alpha-chlorohydrin to one molecule of toluene-para-sulphonamide to produce di-(alpha-methyl-beta-hydroxy propylene) toluene para-sulphonamide, treating the so produced di-(alpha-methyl-beta-hydroxy propylene) toluene para-sulphonamide with sulphuric acid at a temperature above 100° C. to effect ring closure and thereby produce 2:6-dimethylmorpholine toluene para-sulphonamide and then hydrolyzing the said 2:6-dimethylmorpholine toluene para-sulphonamide with sulphuric acid to remove the toluene parasulphonyl group and set free the 2:6-dimethylmorpholine.

5. As a new body, 2:6-dimethylmorpholine being in the pure condition a colorless liquid boiling at about 145° C. under atmospheric pressure, having an ammoniacal odor and being a strong base.

6. In the manufacture of morpholines of the type

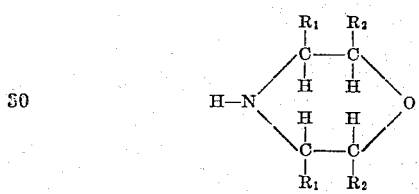

wherein $R_1$ represents hydrogen or a benzene nucleus and $R_2$ represents hydrogen, an alkyl group or a carboxylic group, the process which comprises reacting an aryl sulphonamide of the type $R-SO_2-NH_2$ wherein R represents a benzene nucleus free from unsubstituted amino groups with a beta-halogeno-alcohol of the type

wherein X represents a halogen, $R_1$ represents hydrogen or a benzene nucleus and $R_2$ represents hydrogen, an alkyl group or a carboxylic group, in the molecular ratio of at least two molecules of said beta-halogeno-alcohol to one molecule of said arylsulphonamide to produce a di-substituted-sulphonamid of the type

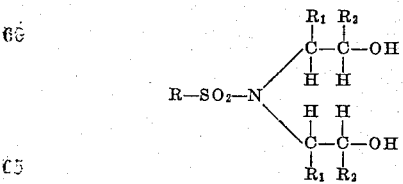

heating the so produced di-substituted arylsulphonamide with sulphuric acid to effect ring closure and thereby produce a morpholyl arylsulphonamide of the type

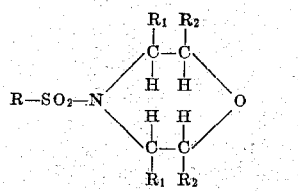

and then hydrolyzing the said morpholyl arylsulphonamide with sulphuric acid to remove the arylsulphonyl group and free the said morpholine compound.

7. In the manufacture of morpholines of the type

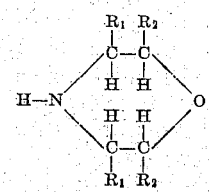

wherein $R_1$ represents hydrogen, or a phenyl group and $R_2$ represents hydrogen, a methyl group or a carboxylic group, the process which comprises reacting an aryl sulphonamide of the type $R-SO_2-NH_2$ wherein R represents a benzene nucleus free from unsubstituted amino groups with a beta-halogeno-alcohol of the type

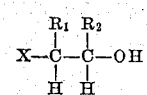

wherein X represents a halogen, $R_1$ represents hydrogen or a phenyl group and $R_2$ represents hydrogen, a methyl group or a carboxylic group, in the molecular ratio of at least two molecules of said beta-halogeno-alcohol to one molecule of the said arylsulphonamide to produce a di-substituted-sulphonamid of the type

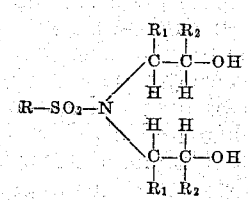

heating the so produced di-substituted arylsulphonamide with sulphuric acid to effect ring closure and thereby produce a morpholyl arylsulphonamide of the type

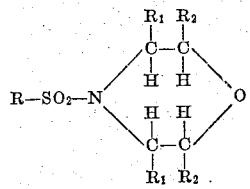

and then hydrolyzing the said morpholyl arylsulphonamide with sulphuric acid to remove the arylsulphonyl group and free the said morpholine compound.

8. In the manufacture of morpholine, the process which comprises reacting toluene-para-sulphonamide wtih ethylene chlorohydrin in the molecular ratio of at least two molecules of ethylene chlorohydrin to one molecule of toluene-para-sulphonamide to produce di-(beta - hydroxyethyl) - toluene-para-sulphonamide, heating the so produced di-(beta-hydroxyethyl)-toluene-para-sulphonamide with sulphuric acid to produce ring closure and thereby produce toluene-para-sulphonyl-morpholylamide and then hydrolyzing the said toluene-para-sulphonyl-morpholylamide with sulphuric acid to remove the toluene-para-sulphonyl group and set free the morpholine.

9. In the manufacture of 3:5-diphenyl-2:6-di-carboxylic-morpholine, the process which comprises reacting toluene-para-sulphonamide with beta-chloro-alpha-hydroxy-beta-phenyl-propionic acid in the molecular ratio of at least two molecules of said propionic acid to one molecule of toluene-para-sulphonamide to produce a toluene-para-sulphonamide having the probable formula

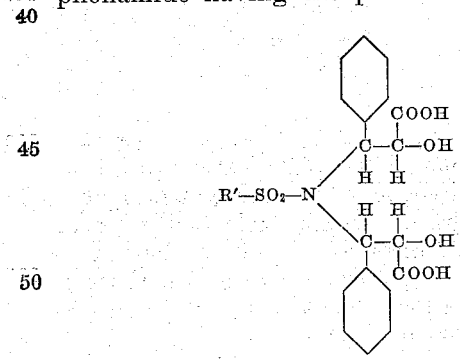

wherein R' represents a tolyl group, heating the said tolyl-para-sulphonamide so produced with sulphuric acid to produce ring closure and thereby produce 3:5-phenyl-2:6-carboxy morpholine toluene-para-sulphonamide and then hydrolyzing the said morpholine para-sulphonamide with sulphuric acid to remove the toluene-para-sulphonyl group and set free 3:5-diphenyl-2:6-dicarboxy morpholine.

10. As new products morpholine compounds of the group consisting of 3:5-di-phenyl-2:6-dicarboxymorpholine and 2:6-dimethyl-morpholine.

11. As a new body, 3:5-diphenyl-2:6-dicarboxy-morpholine having the probable formula

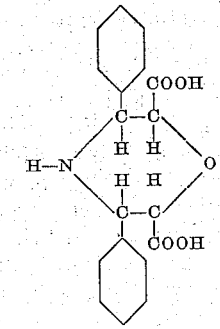

In testimony whereof we affix our signatures.

JOSEPH BARON PAYMAN.
HENRY ALFRED PIGGOTT.